Nov. 20, 1956     C. R. MAYO ET AL     2,771,002

APPARATUS FOR USE WITH XEROGRAPHIC X-RAY POWDER IMAGES

Filed June 17, 1954     5 Sheets-Sheet 1

INVENTOR.
CLYDE R. MAYO
HERBERT E. CRUMRINE
JOSEPH F. ROSENTHAL

BY Harold E. Stonebraker

ATTORNEY

Nov. 20, 1956  C. R. MAYO ET AL  2,771,002
APPARATUS FOR USE WITH XEROGRAPHIC X-RAY POWDER IMAGES
Filed June 17, 1954  5 Sheets-Sheet 2

INVENTOR.
CLYDE R. MAYO
HERBERT E. CRUMRINE
BY  JOSEPH F. ROSENTHAL

Harold E. Stonebraker
ATTORNEY

Nov. 20, 1956    C. R. MAYO ET AL    2,771,002
APPARATUS FOR USE WITH XEROGRAPHIC X-RAY POWDER IMAGES
Filed June 17, 1954    5 Sheets-Sheet 3

INVENTOR.
CLYDE R. MAYO
HERBERT E. CRUMRINE
BY    JOSEPH F. ROSENTHAL

Harold E. Stonebraker
ATTORNEY

Nov. 20, 1956   C. R. MAYO ET AL   2,771,002
APPARATUS FOR USE WITH XEROGRAPHIC X-RAY POWDER IMAGES
Filed June 17, 1954   5 Sheets-Sheet 4

INVENTOR.
CLYDE R. MAYO
HERBERT E. CRUMRINE
JOSEPH F. ROSENTHAL
BY
Harold E. Stonebraker
ATTORNEY Nov. 20, 1956   C. R. MAYO ET AL   2,771,002
APPARATUS FOR USE WITH XEROGRAPHIC X-RAY POWDER IMAGES
Filed June 17, 1954   5 Sheets-Sheet 5

INVENTOR.
CLYDE R. MAYO
HERBERT E. CRUMRINE
JOSEPH F. ROSENTHAL
BY Harold E. Stonebraker
ATTORNEY

United States Patent Office 2,771,002
Patented Nov. 20, 1956

2,771,002

APPARATUS FOR USE WITH XEROGRAPHIC X-RAY POWDER IMAGES

Clyde R. Mayo, Herbert E. Crumrine, and Joseph F. Rosenthal, Rochester, N. Y., assignors to The Haloid Company, Rochester, N. Y., a corporation of New York Application June 17, 1954, Serial No. 437,526

3 Claims. (Cl. 88—24)

This invention relates to apparatus for use with xerographic X-ray powder images, and has for its purpose to afford a structure for viewing or photographing such an image which can be conveniently operated and is highly efficient for either examining the image by ocular inspection or for making a photographic record of the image.

The customary procedure in xerographic photography is to transfer a powder image from a selenium-coated or other xerographic image plate to a transfer sheet and affix the powder image to the transfer sheet, but in the case of X-ray powder images, it is not always necessary to transfer and affix the image to a transfer sheet, and in such cases it is essential to provide convenient means for viewing the image and also for making a photographic record of the same where desirable, and one of the purposes of this invention is to afford mechanism that effectively illuminate a powder X-ray image for either viewing or photographing, through the instrumentality of means that directs light onto the image in such a way that there is maximum illumination without any reflection into the eye of the observer or into the lens of a camera when the latter is employed to record the image, while protecting the image against light that might create specular reflections from the background areas of the plate.

Another purpose of the invention is to afford a structure of the type mentioned including a cabinet that effectively prevents access of external or stray light from the back, sides, or top, and including xerographic plate-supporting means arranged in such fashion that a powder image on the plate is in an advantageous position for easy viewing and is effectively lighted either for viewing or photographic recording.

Still a further object of the invention is to provide in conjunction with such an apparatus a camera mounted upon a movable support that is positionable in an inoperative position when the image is being viewed and in an operative position for purpose of recording the powder image on film, the camera support being provided with a suitable curtain which can be drawn to close the viewing opening at the front of the cabinet and thus to prevent access of light through the front opening when the powder image is being photographed.

To these and other ends, the invention consists in the construction and arrangement of parts that will appear clearly from the following description when read in conjunction with the accompanying drawings, the novel features being pointed out in the claims following the specification.

Figure 1:
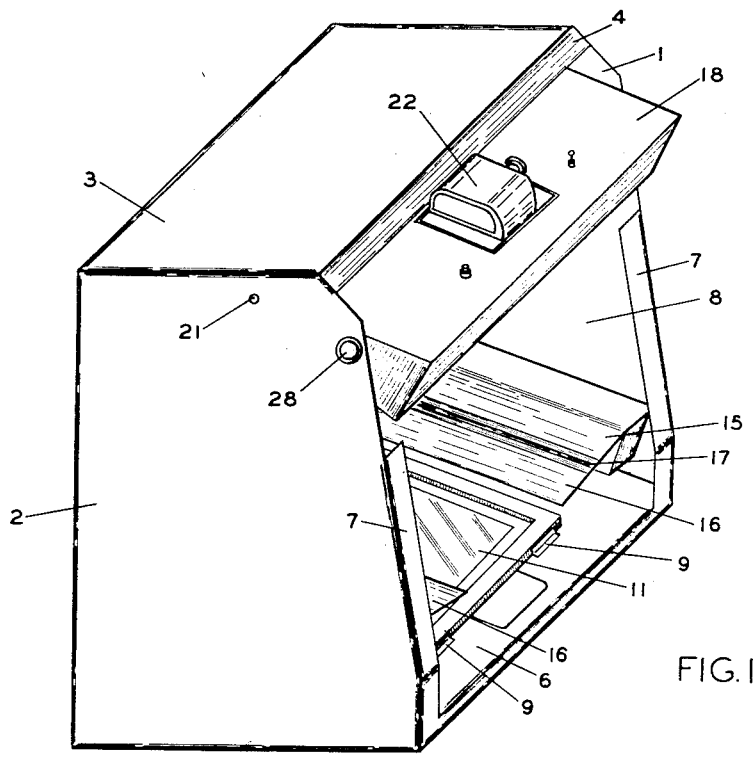
Fig. 1 is a perspective view of a preferred embodiment of the invention showing the camera support in operative position, before lowering the camera curtain.
Figure 2:
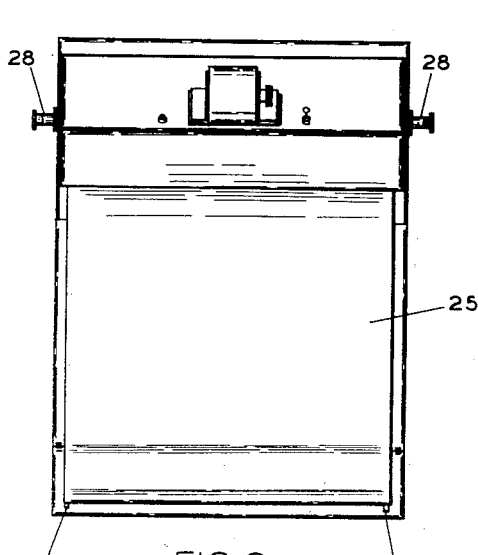
Fig. 2 is a front elevation of the same, showing the camera curtain lowered.
Figure 3:
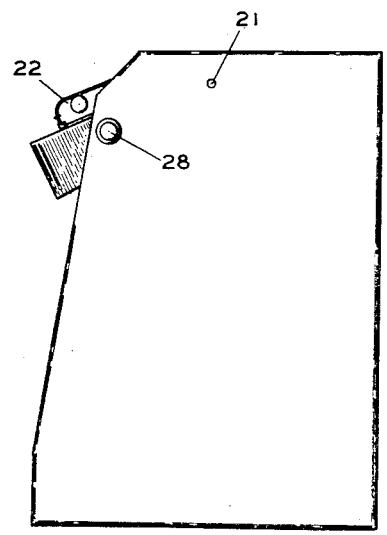
Fig. 3 is a view in side elevation of the structure as shown in Fig. 1.
Figure 4:
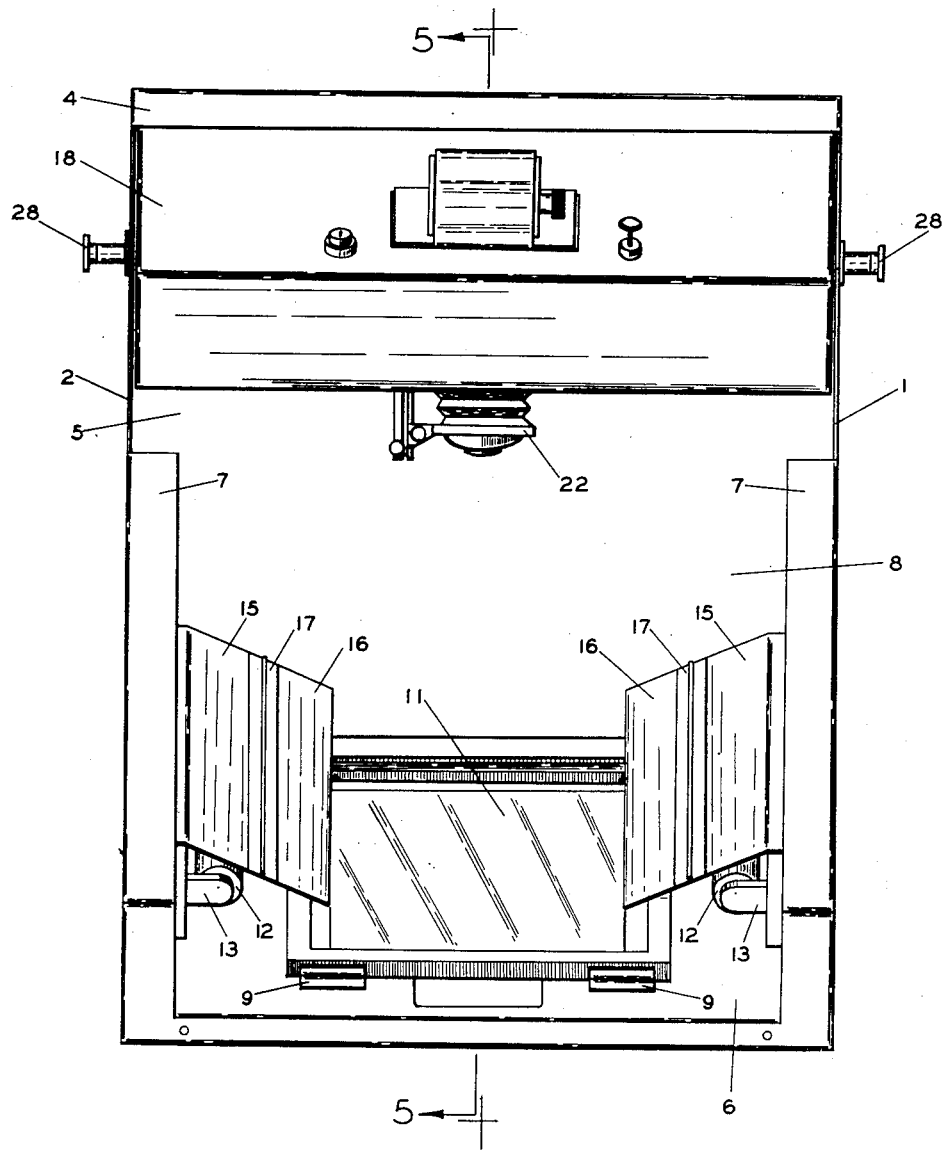
Fig. 4 is an enlarged front elevation similar to Fig. 2, with the camera curtain in elevated position.

Referring more particularly to the drawings in which like reference numerals refer to the same parts throughout the several views, and to Figs. 1 to 6 inclusive which illustrate one practical embodiment of the invention, the structure includes a cabinet or housing that is so constructed as to prevent light sources external of the cabinet from reaching the plate from the sides, rear, or top, and producing undesirable specular reflections from the background areas of the plate. To accomplish this, the cabinet includes side walls 1 and 2, a top wall 3 terminating in a downwardly inclined front portion 4, a rear wall 5, and a bottom wall 6 suitably secured between the rear and side walls, which latter terminate at their forward edges in extensions 7 that extend a slight distance toward each other perpendicularly to the side walls 1 and 2, while 8 designates an opening at the front of the cabinet between the side walls 1 and 2 and through which a powder image can be viewed.

It will be understood that an X-ray powder image is first formed on a selenium-coated xerographic plate in the usual well known manner, and in order to position such plate and powder image conveniently for viewing or making a film recording, there is provided a plate-supporting means comprising suitable positioning elements or flanges indicated at 9 and mounted upon the bottom wall 6 which latter is arranged at an angle to the bottom of the cabinet, so that the xerographic plate when positioned for inspection is arranged at a slight angle or about 20° to the horizontal, affording a convenient position of the plate for viewing a powder image readily and effectively. Any suitable and convenient positioning and retaining devices for the xerographic plate may be used in place of the flanges 9, and if preferred, the plate may be inserted from a side of the housing instead of from the front.

Such a selenium-surfaced or other xerographic plate with a powder image thereon is indicated at 11, and after the xerographic plate is charged, exposed, and the electrostatic image developed with developer powder as usual in the xerography process, it is positioned in the supporting means 9 on the bottom wall 6, and when in this position the powder image can be fully and accurately viewed by the operator, or can be photographed onto a film for making a permanent record.

In order to present a clear, full, and accurate view of the image for inspecting or photographing, it is important to provide lighting means such that the light is directed onto the powder image and xerographic plate at a slight angle so that the light strikes the plate in a glancing direction of preferably approximately 20° or less to the plane of the xerographic plate and any light striking the discharged or exposed selenium-coated metal surfaces of the xerographic plate will not be reflected away from the plate in a direction perpendicular thereto. Thus the eye of the operator or the lens of the camera is protected against direct reflections from the mirror-like surfaces of the plate, while the light striking the powder image or undischarged areas of the plate is scattered so that it does not create any adverse effect such as would result from specularly reflected portions of light directed toward the eye of the observer or the lens of the camera. As a consequence, the image appears much more sharply and accurately, with the proper contrast between the image and background areas.

Figure 6:
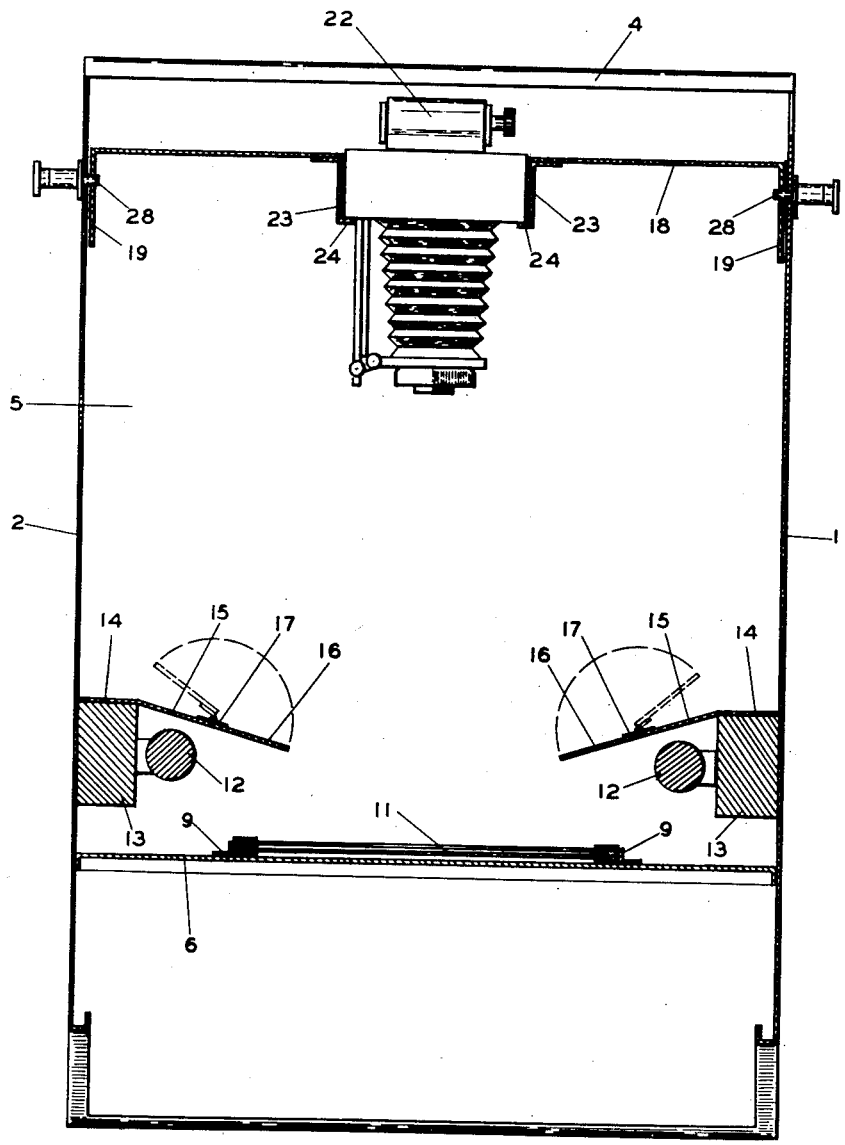
Fig. 6 is a vertical sectional view on line 6—6 of Fig. 5, illustrating the light shields in full lines in position for viewing or photographing an image and in dotted lines in position for inserting or removing an image plate.

This is accomplished by providing suitable lighting means, for example elongated light tubes 12, preferably fluorescent lamps, suitably mounted on supports 13 on the side walls 1 and 2 of the cabinet, and arranged in parallel relation to the edges of the plate support 9, the fluorescent lamps 12 being disposed slightly above the xerographic plate as shown and between the xerographic plate and the side walls 1 and 2, while arranged above the lamps 12 are light shields including base portions 14 suitably attached to the supports 13, and downwardly inclined portions 15 that overlie the lamps 12, while 16 designate inner portions of the shields hinged to the portions 15 at 17, and adapted when swung downwardly to the full line position shown in Fig. 6 to project somewhat over the side edges of the xerographic plate 11. The portions 16 preferably extend downwardly at the same angle as the portions 15 of the light shields, and act to concentrate maximum light onto the powder image and to direct it at such an angle that the light cannot be reflected toward the eye of the observer or toward the lens of the camera. The light shields are made in sections as shown to permit swinging upwardly the lower sections 16 to the positions shown in dotted lines, when an image plate is to be inserted or removed.

By this arrangement, the only reflection that occurs is from the image areas and from the light sources within the housing which direct light onto the plate at an angle to prevent undesirable specular reflection from background areas. Any reflection that might otherwise result from light sources external of the cabinet is effectively prevented by the side, top, and back walls of the cabinet.

In order to photograph a powder image on the xerographic plate, it is necessary to provide a camera which can be operatively positioned with its longitudinal axis disposed perpendicularly to the xerographic plate, or arranged in an inoperative position at the rear of the cabinet when the plate is to be viewed. For this purpose, there is provided a camera support consisting of a top wall 18 extending across the cabinet and depending side portions or flanges 19 pivoted at 21 on the side walls 1 and 2, while 22 designates a conventional camera positionable in an opening arranged centrally in the top wall 18, and detachably held therein by the depending walls 23 having supporting flanges 24 at their lower edges on which the camera body rests.

Figure 5:
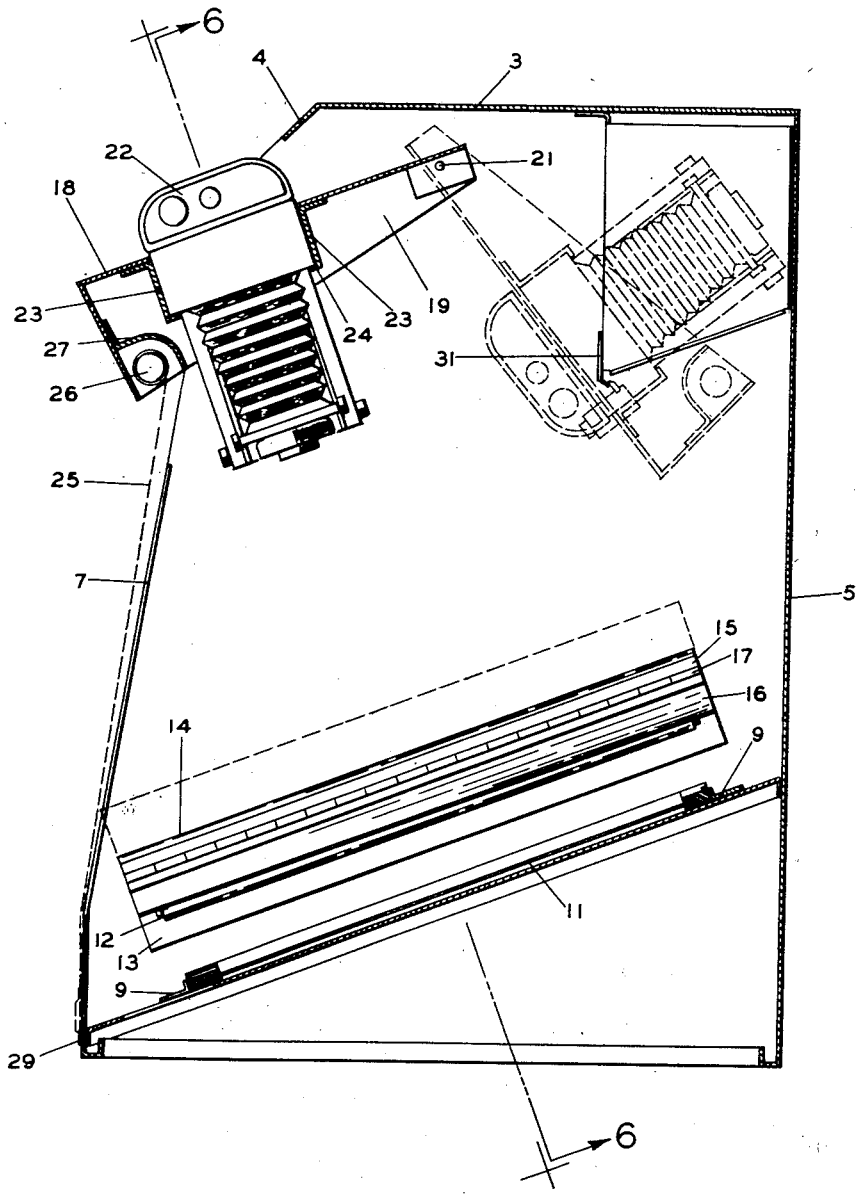
Fig. 5 is a vertical sectional view taken centrally of Fig. 4 in a plane parallel to the side walls of the cabinet and showing the light shield in full lines in position for viewing or photographing an image and in dotted lines for inserting or removing an image plate, while the camera is illustrated in full lines in operative position and in dotted lines in its inoperative position.

The camera support is so arranged that when in operative position as illustrated in full lines in Fig. 5, it is located at the front of the housing within the opening 8 and with its longitudinal or lens axis arranged perpendicularly to and centrally of the xerographic plate. It is desirable to close the viewing opening at the front of the housing when making a film recording, in order to prevent specular reflection into the camera lens from the background areas of the plate due to light external of the housing entering through the front opening of the housing, and to accomplish this, the camera support is provided with a spring roller shade 25 that is suitably mounted on a spring roller 26 arranged within a housing 27 between the downwardly depending portions 19 of the support. In order to maintain the camera support in its forward or operative position, there are provided suitable locking devices 28 mounted on the side walls 1 and 2 and arranged to releasably engage the flanges 19 of the camera support and retain the latter in its operative position. The curtain 25 can then be drawn down to close the viewing opening at the front of the cabinet and is held in such lowered position by suitable retaining devices 29. When the camera is not in use, the operator elevates the curtain 25 and releases the locking devices 28, permitting the camera support to be swung rearwardly to the position illustrated in dotted lines in Fig. 3 where it is retained by suitable catches 31.

With this arrangement, the lighting means is properly effective to illuminate the powder image in such fashion that it appears clearly and without undesirable reflection for either viewing or film recording, the parts being readily adapted for photographing the powder image by arranging the camera support in operative position and positioning the curtain so as to close the viewing opening at the front of the cabinet, while the lighting means cooperates with the image in either application to give the most effective result and permit accurate recording of the image or satisfactory viewing of the image when desired.

Figure 7:
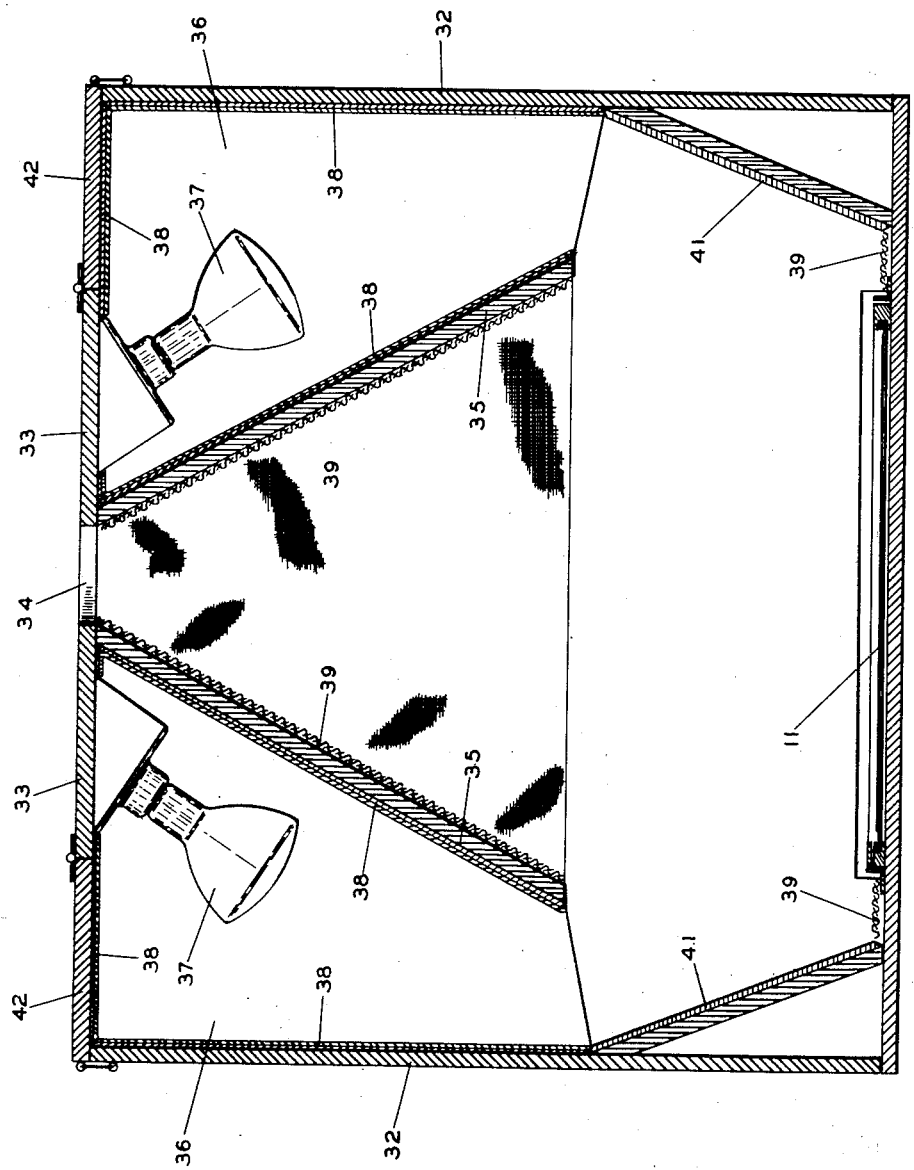
Fig. 7 is a transverse sectional view of a possible modification, showing a somewhat different arrangement of lighting device for accomplishing the same effect.

In Fig. 7 is illustrated a slightly modified form of lighting means that can be utilized for attaining the desired lighting effect without permitting reflection from the xerographic plate that would distort or modify the true image, and in this construction, there is provided a cabinet including side walls 32 and a top wall 33 having a central opening 34 through which light can be directed onto the lens of a camera, which can be located thereabove and is not shown. Extending downwardly from the sides of the opening 34 are inclined walls 35 the lower ends of which terminate in spaced relation to the side walls 32, affording lamp chambers 36 within which are located suitable lamps 37.

The downwardly inclined walls 35 and side walls 32 are preferably covered with asbestos lined with aluminum foil layers as indicated at 38, while the inner surfaces of the inclined walls 35 and likewise the bottom wall of the cabinet are preferably covered with black velveteen or other suitable material indicated at 39. With this arrangement, the light within the lamp chambers 36 is reflected from the aluminum surfaces 38 and directed downwardly through the openings at the bottoms of the lamp chambers and onto mirrors 41 arranged at the bottom of the cabinet at a slight angle to the vertical as shown. The angle of the mirrors 41 in relation to lamps 37 is such that light from each lamp chamber 36 is reflected by its mirror 41 onto a powder image and plate at the bottom of the cabinet at a slight angle, with the result that none of the light is reflected upwardly toward the camera in a direction perpendicular to the plane of the plate. 42 designate pivoted doors at the top of the cabinet to permit servicing the lamps and electrical connections, and the lighting mechanism and cabinet just described are also adaptable for use in viewing an image and image plate by providing a suitable viewing opening at the top or front of the cabinet.

The structures shown and described above may also be employed with luminescent images instead of the usual powder images used in xerography, and ultraviolet or other light may be substituted for fluorescent or incandescent lamps if desirable.

While the invention has been disclosed in conjunction with certain particular embodiments, it is not confined to the details of construction herein set forth and this application is intended to cover such departures or modified arrangements as may come within the purposes of the improvements or the scope of the following claims.

I claim:

1. Apparatus for use with xerographic X-ray powder images comprising a cabinet having top, bottom, side and rear walls, said walls preventing external light from entering the cabinet and being reflected from the plate, xerographic plate-supporting means located above said bottom wall, lighting means consisting of tubular lamps arranged slightly above said plate-supporting means in spaced parallel relation to the side edges thereof and between said side walls and a central vertical plane parallel thereto, light shields located over said lamps in proximity and parallel relation thereto, and extending from the side walls downwardly toward said plate-supporting means acting to direct light onto a xerographic plate and powder image on said plate-supporting means in a direction at a slight angle to the plate thereby preventing light from being reflected away from the plate in a direction perpendicular thereto, a camera located above the plate-supporting means with its longitudinal axis in the aforesaid vertical plane and perpendicular to the plane of said plate, a camera support movable from an inoperative position at the upper rear portion of the cabinet to an operative position at the upper front portion of the cabinet, and a curtain mounted on said camera support and positionable in the opening at the front of the cabinet when the camera is in operative position.

2. Apparatus for use with xerographic X-ray powder images comprising a cabinet having top, bottom, side and rear walls, said walls preventing external light from entering the cabinet and being reflected from the plate, xerographic plate-supporting means located above said bottom wall and inclined upwardly from front to rear of the cabinet, lighting means consisting of tubular lamps arranged slightly above said plate-supporting means in spaced parallel relation to its side edges and between said side walls and a central vertical plane parallel thereto, light shields located over said lamps in proximity and parallel relation thereto and extending from the side walls downwardly toward said plate-supporting means acting to direct light onto a xerographic plate and powder image on said plate-supporting means in a direction at a slight angle to the plate thereby preventing light from being reflected away from the plate in a direction perpendicular thereto, a camera located above the plate-supporting means with its longitudinal axis in said vertical plane and perpendicular to the plane of said plate, a camera support pivotally mounted in the cabinet and movable from an inoperative position at the rear of the cabinet to an operative position at the front of the cabinet, a curtain mounted on said camera support and positionable in the opening at the front of the cabinet when the camera is in operative position, and releasable retaining devices acting to hold the camera support in either operative or inoperative position.

3. Apparatus for use with xerographic X-ray powder images comprising a cabinet having top, bottom, side and rear walls, said walls preventing external light from entering the cabinet and being reflected from the plate, xerographic plate-supporting means located above said bottom wall and inclined upwardly from front to rear, lighting means arranged slightly above and on both sides of said plate-supporting means between said side walls and a central vertical plane parallel to said side walls, light shields located over said lighting means and extending from said side walls inwardly, said light shields including flat portions that are inclined downwardly toward said plate-supporting means a substantial distance beyond the lighting means at an angle of not more than approximately 20° to the plane of the xerographic plate whereby light strikes the powder image and xerographic plate at an angle of not more than approximately 20° to the plane of the xerographic plate and is prevented from being reflected away from the plate in a direction perpendicular thereto, a camera located above the plate-supporting means, and a camera support movable from an inoperative position at the upper rear portion of the cabinet to an operative position at the upper front portion of the cabinet, said camera support supporting said camera with its longitudinal axis in the aforesaid vertical plane and perpendicular to the plane of the plate when in operative position.

References Cited in the file of this patent

UNITED STATES PATENTS

| | | |
|---|---|---|
| 2,180,007 | Hopkins | Nov. 14, 1939 |
| 2,494,495 | Tait | Jan. 10, 1950 |
| 2,509,072 | Pratt | May 23, 1950 |